(12) United States Patent
Faulkner

(10) Patent No.: US 11,142,045 B2
(45) Date of Patent: Oct. 12, 2021

(54) SHADE SYSTEM

(71) Applicant: Katelin Faulkner, Key West, FL (US)

(72) Inventor: Katelin Faulkner, Key West, FL (US)

( * ) Notice: Subject to any disclaimer, the term of this patent is extended or adjusted under 35 U.S.C. 154(b) by 17 days.

(21) Appl. No.: 16/743,668

(22) Filed: Jan. 15, 2020

(65) Prior Publication Data

US 2020/0223294 A1 Jul. 16, 2020

Related U.S. Application Data

(60) Provisional application No. 62/792,464, filed on Jan. 15, 2019.

(51) Int. Cl.
*B60J 3/00* (2006.01)
*B63B 17/02* (2006.01)

(52) U.S. Cl.
CPC ............... *B60J 3/002* (2013.01); *B63B 17/02* (2013.01); *B63B 2017/026* (2013.01)

(58) Field of Classification Search
CPC . B63B 17/02; B63B 17/023; B63B 2017/026; B60J 1/205; B60J 1/2052; B60J 1/2066; B60J 1/2069; B60J 1/2072; B60J 1/2077; B60J 3/0256; B60J 3/002; B60J 3/005; B60J 3/0234; E06B 9/40; E06B 2009/407; E06B 9/58
USPC ...................................... 160/271, 272, 273.1
See application file for complete search history.

(56) References Cited

U.S. PATENT DOCUMENTS

| | | | | |
|---|---|---|---|---|
| 5,344,206 A | * | 9/1994 | Middleton | B60J 1/2025 160/271 |
| 5,579,820 A | * | 12/1996 | LePage | E04H 6/04 160/268.1 |
| 5,649,584 A | * | 7/1997 | Leubecker | B60J 1/2091 160/370.23 |
| 5,860,466 A | * | 1/1999 | Kao | B60J 1/2077 160/370.22 |
| 6,830,091 B2 | * | 12/2004 | Hintennach | B60J 1/2088 160/172 V |
| 8,590,959 B2 | * | 11/2013 | Durm | B60J 1/2041 296/97.8 |
| 8,960,261 B1 | * | 2/2015 | Williams | B60J 1/2025 160/370.22 |
| 2014/0041814 A1 | * | 2/2014 | Roberts | A47H 5/03 160/271 |
| 2017/0158031 A1 | * | 6/2017 | Tisdale | B60J 1/2038 |

* cited by examiner

*Primary Examiner* — Ajay Vasudeva
(74) *Attorney, Agent, or Firm* — The Dobrusin Law Firm, PC

(57) ABSTRACT

A shade system includes a first track and a second track spaced a distance away from the first track, a shade is connected or interconnected to the track to slide along the track, and a cassette positioned at an end of the shade to receive the wound shade therein. The shade system may be configured to cover an area where the distance between the first and second track may varies. The shade may comprise a top section and a bottom section, and a central overlap portion to allow the top and bottom sections to slide with respect to each other. The shade may further include a plurality of adjacent panels configured to slide with respect to each other to provide shade coverage of an area where the first and second tracks are spaced apart at varying distances. The panels may be interconnected by guide wires and top and bottom sections may be supported by telescoping support rods.

7 Claims, 5 Drawing Sheets

SHADE SYSTEM

CROSS-REFERENCE TO RELATED APPLICATION

This application claims priority to U.S. Provisional Patent Application No. 62/792,464 filed on Jan. 15, 2019 and entitled VERTICAL ROLLER SHADE, which is hereby incorporated by reference

FIELD OF INVENTION

The field of invention relates generally to a system for shading a window or open space.

BACKGROUND

Many piloted or driven vehicles require implements for dealing with unwanted sunlight that may impair the sight of a driver or pilot. Vehicles of all types, including boats, yachts, airplanes, cars, and other vehicles all, at times, require unwanted sunlight to be blocked or partially blocked.

While numerous designs for roller shade systems have been designed, there are currently no roller shade options that are configured to follow curves, complex shapes and areas with varying heights, particularly on yachts, airplanes, RVs, or other vehicles or structures with non-linear windows.

One common existing option is a ceiling installment which angles/cuts off the curved area. This option wastes space and reduces seating. Another common option is the snap on sunscreen system which adequately provides sunshade/privacy, but this method is inefficient and inconvenient. Once the snap on screen is installed it typically stays up due to lack of storage options and cumbersome process of installing and removing the screen. There is no product in existence that deploys a shade over a curved, special shape and/or area with varying height, and retracts it when not needed.

For at least these reasons, an improved shade system and related method are needed in the industry.

SUMMARY

A shade system is generally presented. The shade system comprises a first track and a second track spaced a distance away from the first track. A shade is connected or interconnected to the track such that a first edge of the shade is slidable along the first track and a second edge opposite the first edge of the shade is slidable along the second track. A cassette is positioned at an end of the shade. The shade is rollable onto itself within the cassette.

In an embodiment, the distance between the first and second track may vary over at least a portion of the track. The shade may comprise a top section and a bottom section, and a central overlap portion where the top and bottom sections overlap one another. The bottom of the top section and the top of the bottom section may be disconnected to allow them to freely slide with respect to one another.

In an embodiment, the shade system includes one or more support rods connected to the shade. Each support rod is connected to at least the top section and the bottom section of the shade. The support rods include a roller or pin 39 at each end disposed within the top track and the bottom track respectively. The support rods may be telescoping to increase or decrease in length as the distance between the first track and the second track varies.

In an embodiment, the shade may comprise two or more adjacent shade panels configured slide with respect to each other. The panels may laterally slide as the shade is opened or deployed. One or more guide wires may be used to interconnect adjacent shade panels and allow them to slide with respect to one another while limiting the total sliding travel of adjacent panels.

BRIEF DESCRIPTION OF THE DRAWINGS

The operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A shade system 10 is generally presented. The shade system 10 may be generally configured to be deployed along a window, series of windows, or open area to reduce sunlight or overall light passing through the windows or open area. The shade system 10 is generally shown and described herein as deployed on a vehicle, however, it will be appreciated that the shade system may be used or installed in any environment that includes windows or where lighting reduction is desired.

Figure 1:
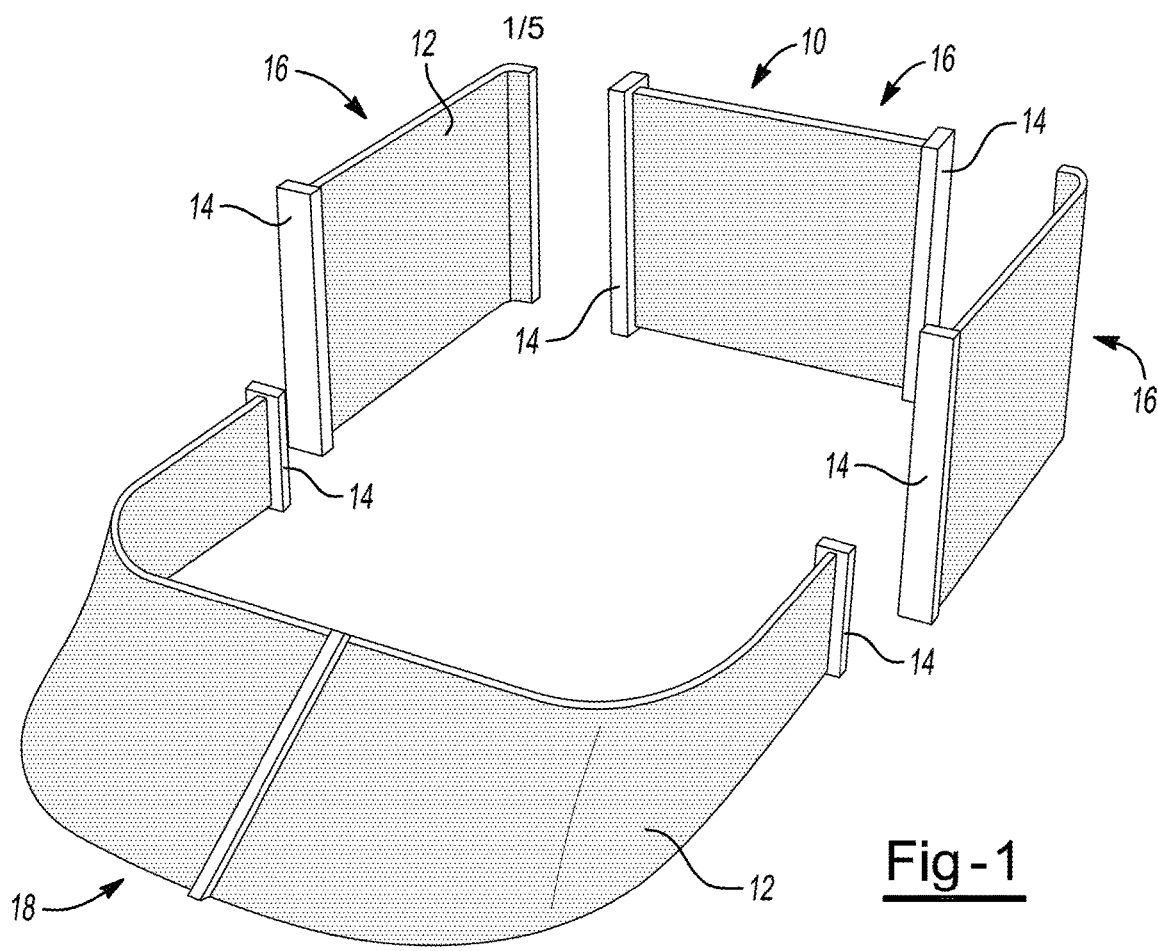
FIG. 1 illustrates shade system including linear and non-linear shades.

With reference to FIG. 1, a shade system 10 is illustrated. The shade system 10 may comprise a shade 12 configured to be opened or deployed across a space near a window or opening, and a cassette 14 configured to hold the shade 12 when it is stored and wound onto itself. The shade 12 may comprise any appropriate material that is configured to reduce the passage of light, such as a mesh or the like. The shade 12 may be opaque or partially transparent. The cassette 14 may be generally hollow and configured to hold the shade 12 therein when wound onto itself. The cassette 14 may include a central axis, such as a spring loaded axis, to allowing winding and unwinding of the shade 12. In an embodiment, the shade system may be deployed in pairs with one cassette 14 on either side of a window. As shown with the front shade 10 in FIG. 1, the opposite shades 12 may be opened to meet in the middle of the window and may be connected, such as through a latch or magnet, to enclose a window or space to be shaded.

The shade system 10 may be adapted for use in a vehicle, such as a boat, yacht, airplane, car, truck, or the like. The shade system 10 may include linear sections 16 that are configured to cover rectangular openings or windows, and non-linear sections 18 that are configured to cover non-rectangular openings or windows. The non-linear sections 14 may be specifically configured to cover areas that have a variable width or height or curved portions with a different radius along one edge of the shade 12 compared with a radius along the opposite edge of the shade 12, as described in further detail below.

Figure 2:
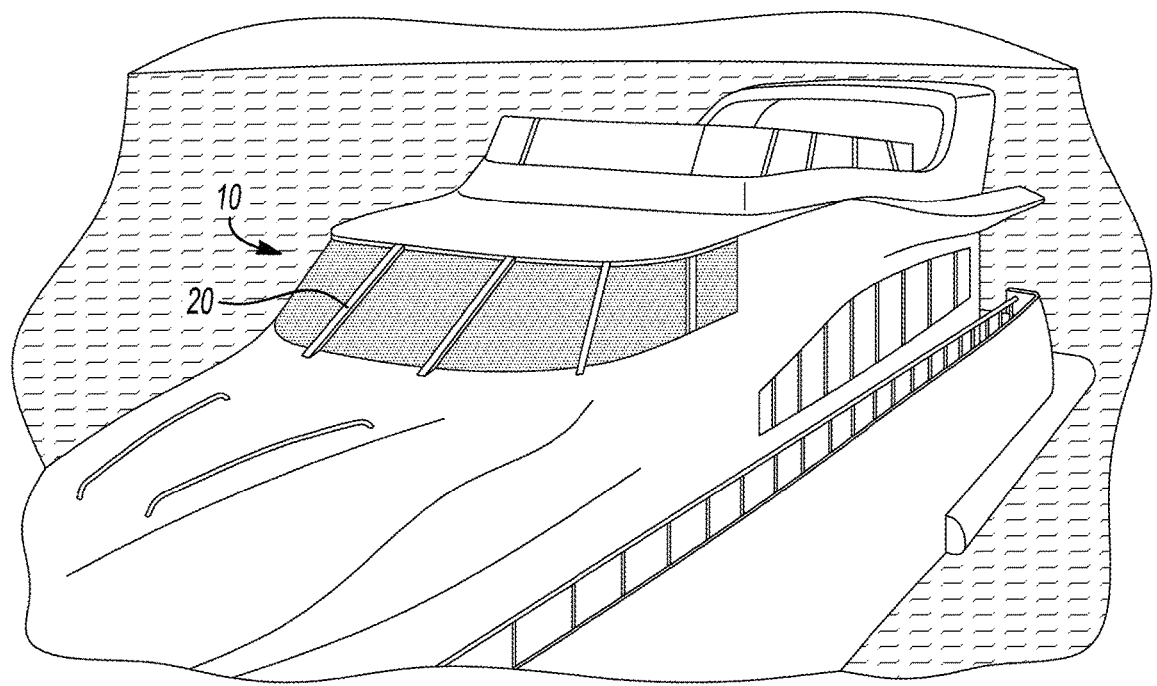
FIG. 2 illustrates a non-linear shade system installed on a yacht.
Figure 3:
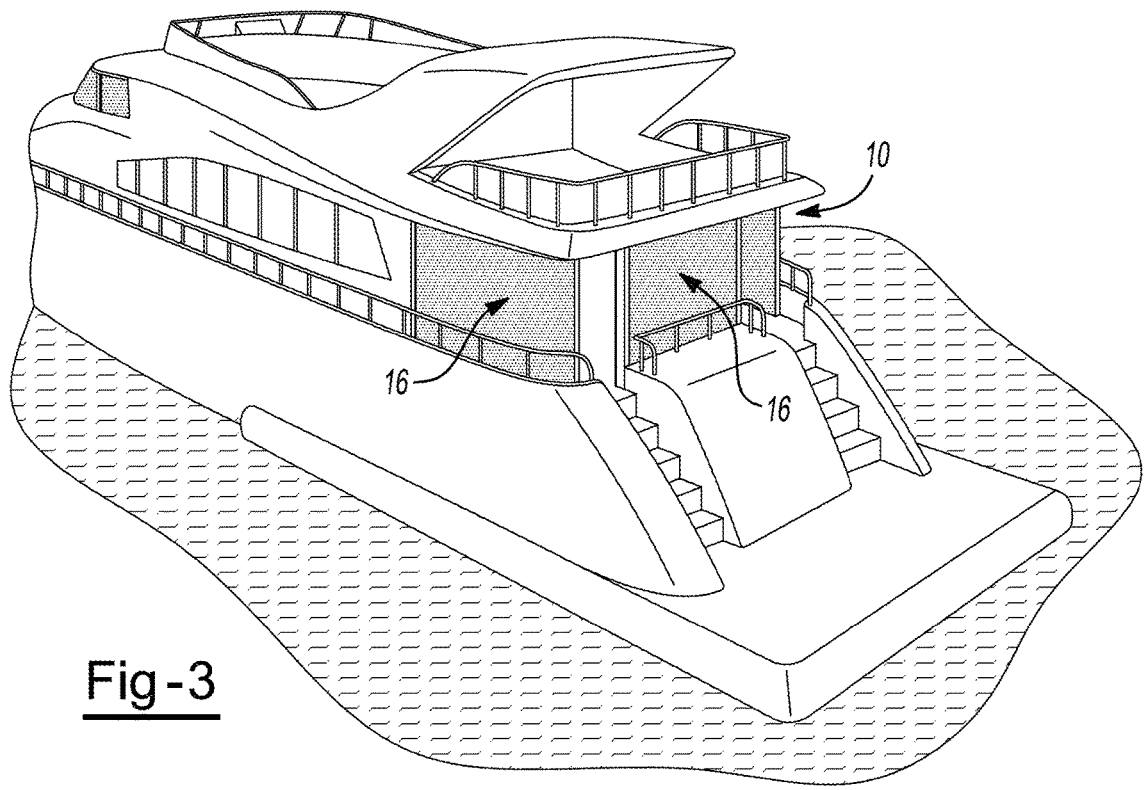
FIG. 3 illustrates linear shades installed on a yacht.

With reference to FIGS. 2 and 3, a shade system 10 is shown installed on a yacht. The yacht includes a front window 20 having a non-linear shade 18 installed on either side of the front window 20. The front window 20 includes variations in height and curve radii between its top and bottom edges. FIG. 3 illustrates linear portions 16 of the shade system to provide shade for rectangular windows and spaces.

Figure 4:
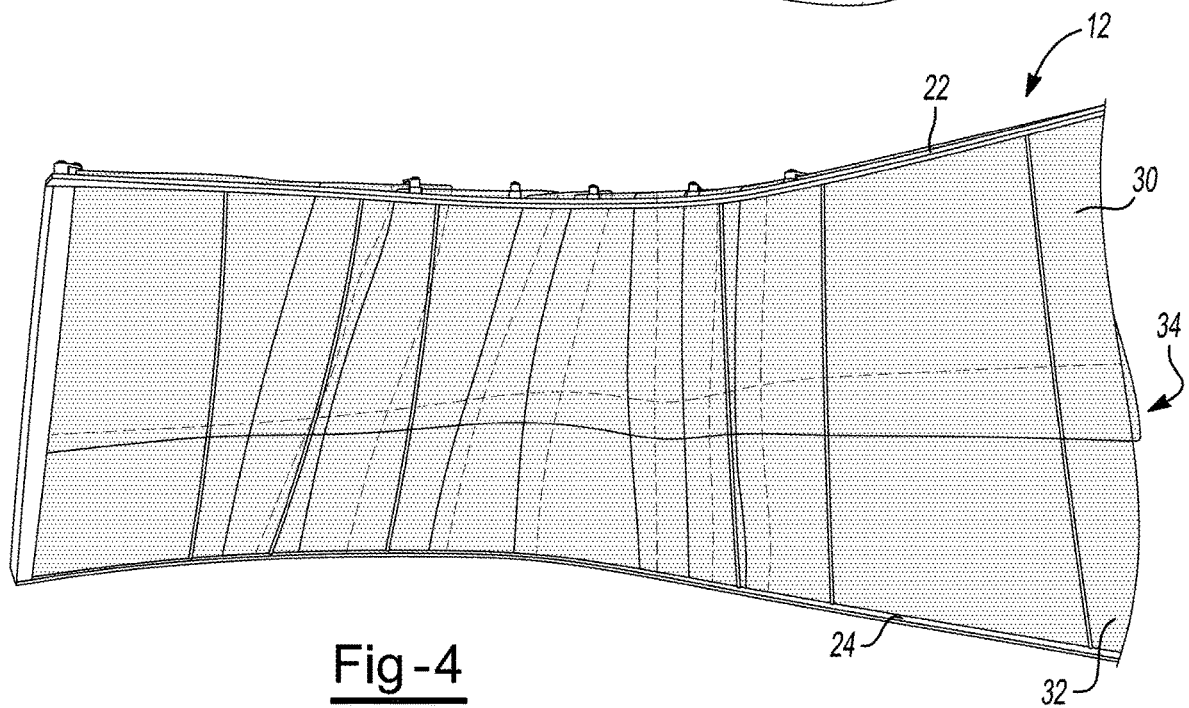
FIG. 4 illustrates an interior side view of a non-linear shade deployed within a track.

The shade system 10 may be implemented using an upper track 22 and lower track 24 to guide positioning of the shade 12 along a window or surface. As shown in FIG. 4, the upper and lower tracks 22, 24 may be arranged parallel or adjacent to edges of a window. The tracks 22, 24 may be configured to retain the top and bottom edges of the shade 12 respectively therein as the shade 12 is opened.

The shade 12 may include a piping connected at or near its top and bottom edge. The piping may be housed within the track 22, 24, such as with in a hollow channel in the track 22, 24, to hold the shade 12 within the track 22, 24. As the shade 12 is opened, the piping may slide along the channel within the track 22, 24 to guide the shade into place. The shade 12 may extend from the track 22, 24 through a slot that is narrower than the channel.

In an embodiment, the upper and lower tracks 22, 24 may include at least a portion that is non-linear. The term "non-linear" as used herein in reference to the tracks 22, 24 may refer to a portion where the distance between the tracks 22, 24 varies or a portion where the upper track 22 and lower track 24 have a different curve radius. It will be appreciated that a track 22, 24 may include both linear and non-linear portions.

Figure 5:
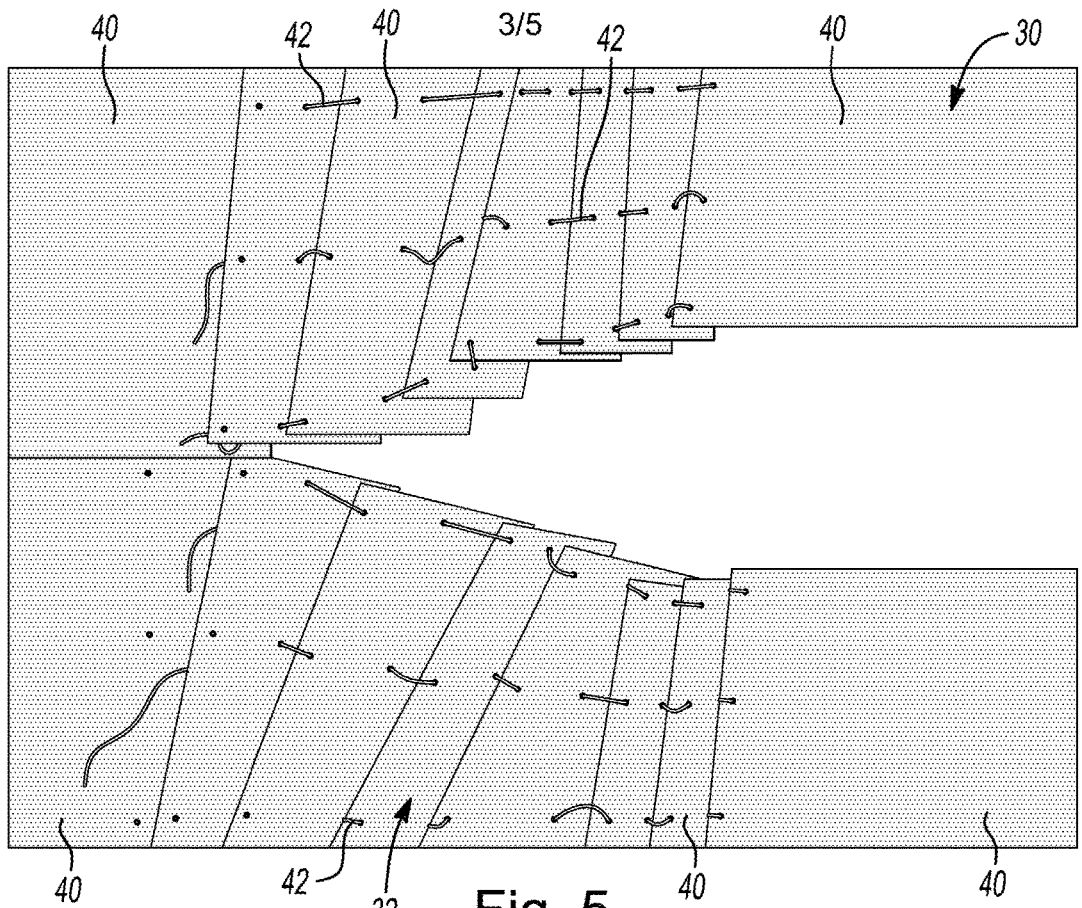
FIG. 5 illustrates top and bottom shade portions spaced apart, where the top and bottom shade portions each including a plurality of shade panels.
Figure 6:
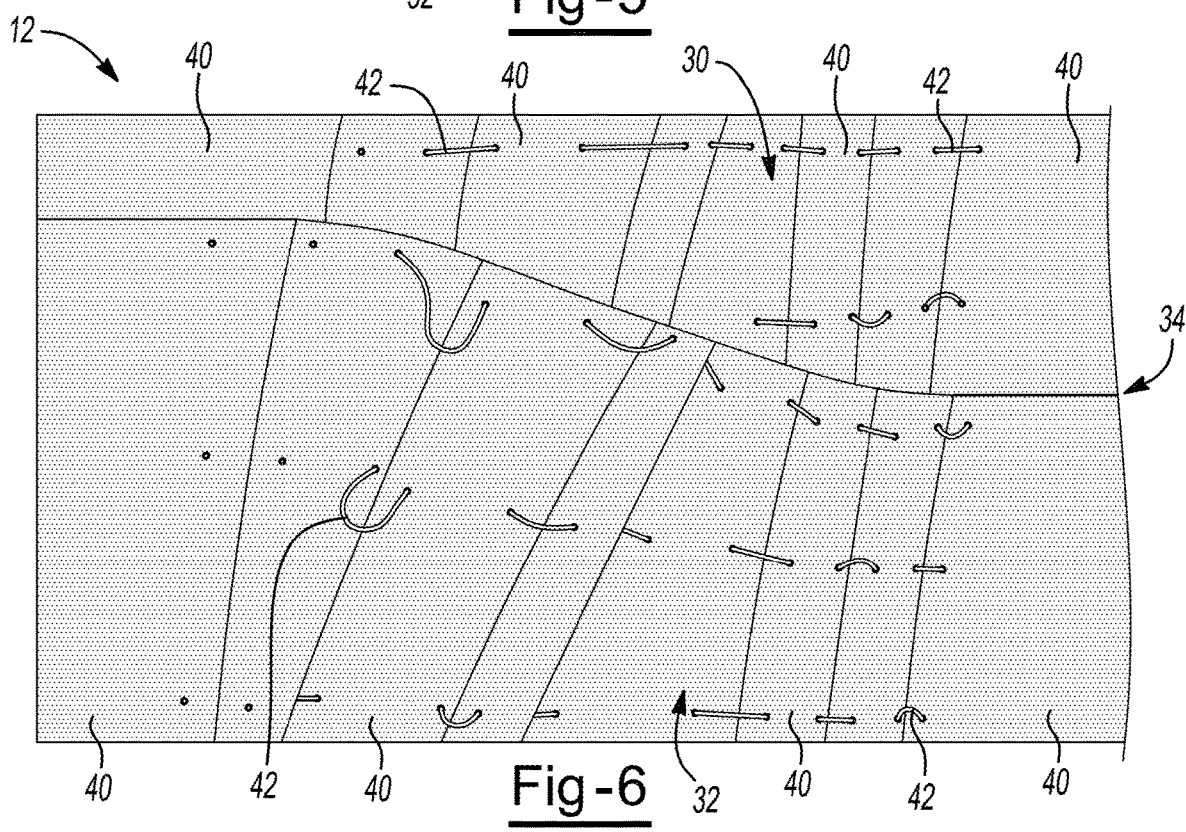
FIG. 6 illustrates top and bottom shade portions overlapped, where the top and bottom shade portions each including a plurality of shade panels.

To accommodate the change in distance between the upper and lower tracks 22, 24 in the non-linear sections, the shade 12 may include a top section 30 and a bottom section 32, as best shown in FIGS. 5 and 6. The top and bottom sections 30, 32 may each comprise one panel or a plurality of panels, as described in further detail below. The top and bottom sections 30, 32 may overlap in a middle section. The top edge of the top section 30 may be held within the upper track 22 and the bottom edge of the bottom section 32 may be held within the lower track 24. The bottom of the top section 30 may overlap the top of the bottom section 32 at a middle overlap section. The bottom and top sections 30, 32 are independent and not connected to each other to allow the top and bottom sections 30, 32 to slide with respect to one another. As the distance between the upper and lower tracks 22, 24 increases, the top and bottom sections 30, 32 will follow the track diverging from one another and thus decreasing the overlap portion 34.

Figure 7:
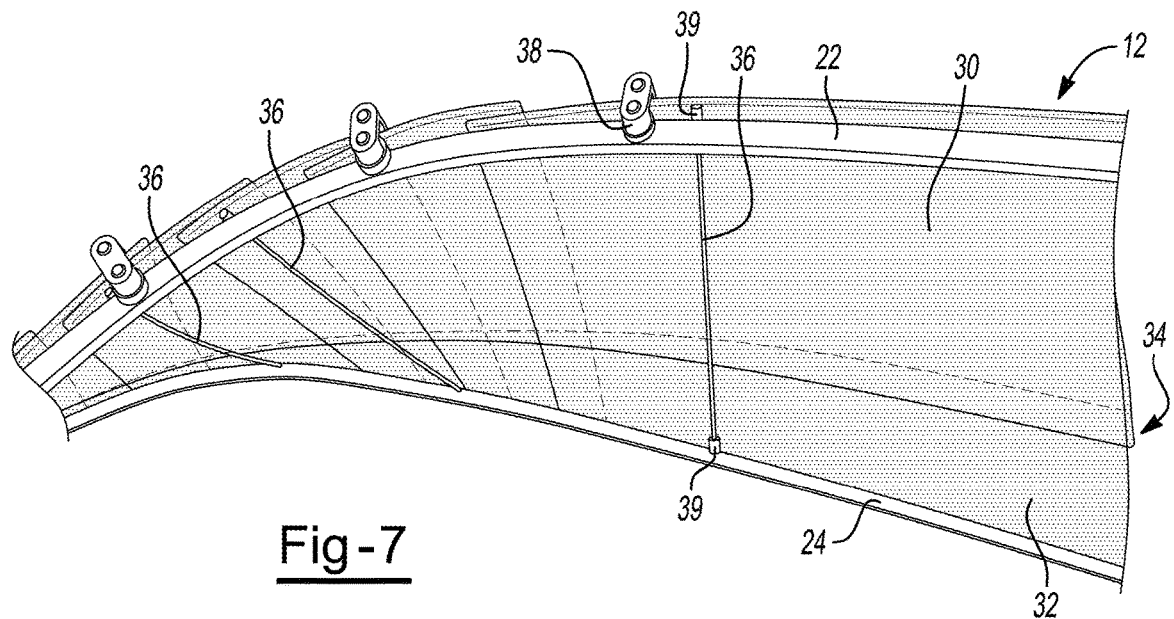
FIG. 7 illustrates a top view of a non-linear shade deployed within a track.
Figure 8:
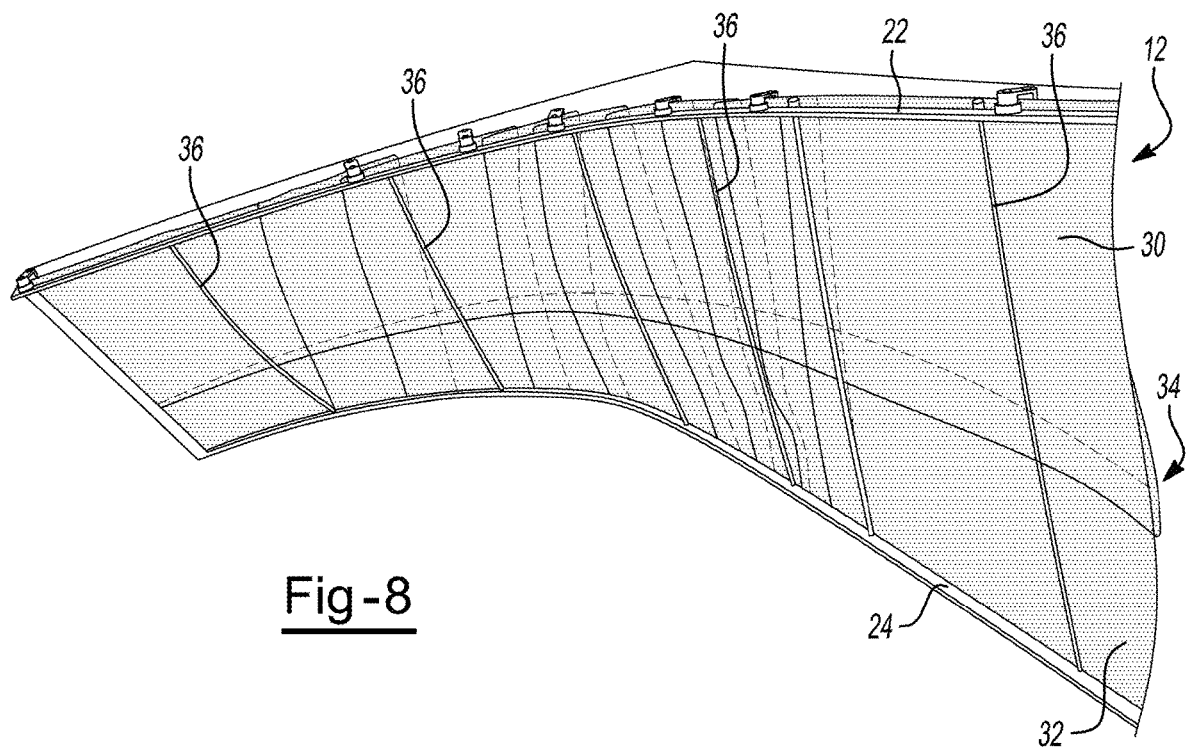
FIG. 8 illustrates a perspective view of a non-linear shade deployed within a track having non-congruent curves.
Figure 9:
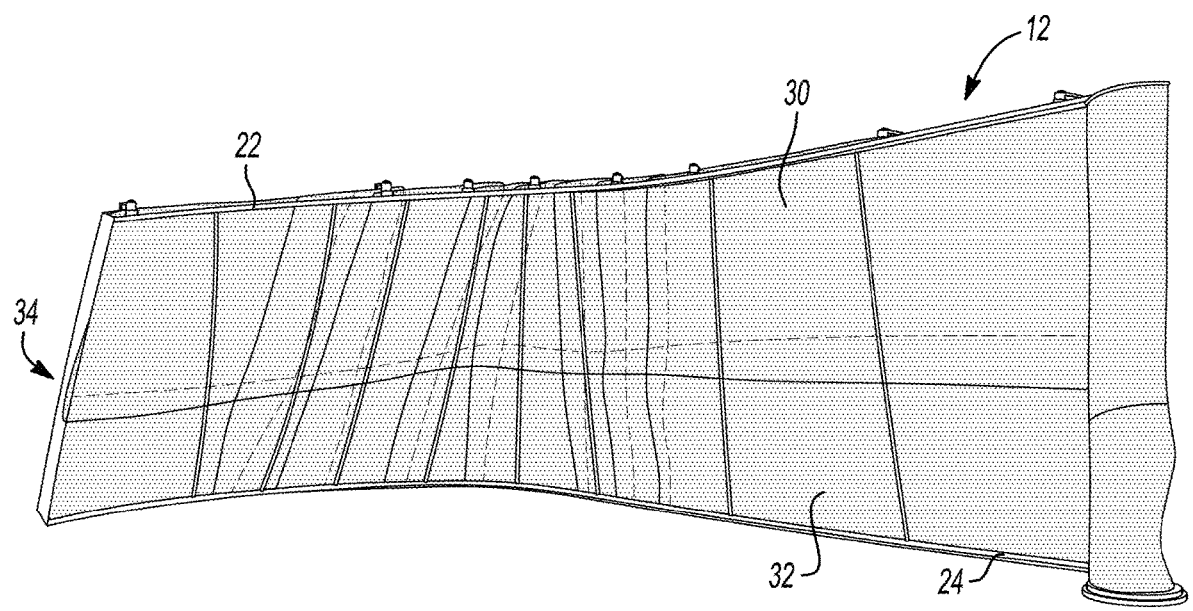
FIG. 9 illustrates a perspective view of a non-linear shade deployed within a track having non-constant spacing between the top and bottom track.

The shade 12 may include one or more support rods 36. The support rods 36 may connect to both the top section 30 and the bottom section 32 and may be arranged generally perpendicular to the upper and lower tracks 22, 24. The support rod 36 may be rigid to provide support for the shade 12 and to maintain the shade 12 in the desired upright alignment. A first support rod 36 may be disposed along the leading edge of the shade 12 and additional support rods 36 may be used as well depending on the length of the shade 12. Each support rod 36 may include a roller or pin 38 at each of its ends that resides within the tracks 22, 24. The roller 38 may be spherically shaped and may assist in guiding the shade 12 along the tracks 22, 24. The support rod 36 may further include telescoping sections, such as shown in FIG. 7. The telescoping sections allow the rod 36 to expand and contract as the distance between the tracks 22, 24 changes, thus providing support for the shade 12 while also adjusting with any changes in the track spacing. In an embodiment where two shades are used, such as illustrated in the front shade in FIG. 1, the leading edge of the opposite shades may include a magnetic connection or latch to connect the two shade portions together.

The top and bottom sections 30, 32 may each be comprised of a plurality of adjacent or cascading panels 40. The panels 40 in FIG. 5 are illustrated with the top and bottom sections 30, 32 spaced apart, and in FIG. 6 with the sections 30, 32 overlapped. The panels 40 may vary in shape and size, to allow for adjustments in the spacing or curvature of the tracks 22, 24. In an embodiment, the panels 40 that makeup the top section 30 may vary in size differently than the panels 40 that makeup the bottom section 32 to allow the shade 12 to form around a first curve having a first radius at the top section 30 and to form around a second curve having a second radius, different than the first radius, at the bottom section 32.

The shade 12 may further include one or more guide wires 42. The guide wires 42 may be disposed between adjacent panels 42 to connect them together and hold them taut with respect to each other when the shade is fully opened. The guide wires 42 may comprise a threading, such as a wire or elastic threading, that allows adjacent panels to move or slide with respect to each other but limits the total travel in either direction of adjacent panels 40. This allows adjacent panels 40 to slide or be stacked onto each other when wound up in the cassette 14 or when only partially deployed, and to be slid away from each other with minimum overlap when fully deployed.

While the shade system 10 is shown and described herein as used in a vehicle, it will be appreciated that the shade system 10 may be used in any appropriate space, including as a sun shade, as a covering, or deployed in any space to provide shade or protection.

In use, the upper and lower tracks 22, 24 may be installed adjacent to a window or opening, such as along the interior of a vehicle window. The window may include linear and/or non-linear sections such that the upper and lower tracks 22, 24 include portions where the distance between them is constant and portions where the distance between them or the radius of their curve varies. A cassette 14 having a wound shade 12 may be disposed at either end of the tracks 22, 24. The shades 12 may be deployed onto the track to cover the window or opening, either through a manual operation by pulling a leading tab or wand connected to each shade 12 or by an automated operation driven by a motorized roller within the cassette 14 or within the tracks 22, 24. In an embodiment the shade system 10 includes a motor to unwind and deploy the shade 10 and a pulley to assist in pulling the shade open and closed.

As the shade 12 is deployed along the track, the top and bottom sections 30, 32 may slide away from each other as needed, reducing the overlap 34, to adjust to changes in the distance between the upper and lower tracks 22, 24. In addition, the panels 40 may slide away from one another as far as allowed by the guide wires 42 and support rods 36. When fully deployed, a first shade 12 on a first window side may be connected to a second shade 12 on a second window side though a magnetic connection or latch on the leading guide bar or support rod 36.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof

I claim:

1. A shade system comprising:
   a first track;
   a second track spaced a distance away from the first track;
   a shade having a first edge that is slidable along the first track and a second edge that is slidable along the second track; and
   a cassette positioned at an end of the shade, wherein the shade is rollable onto itself within the cassette;
   wherein the distance between the first and second track varies over at least a portion of the track, wherein the shade comprises a top section and a bottom section, and wherein the top section and bottom section are configured to overlap along a middle portion of the shade, wherein the bottom of the top section and the top of the bottom section are disconnected to allow them to freely slide with respect to one another.

2. The shade system of claim 1 further comprising one or more support rods connected to the shade, wherein each support rod is connected to the top section and the bottom section.

3. The shade system of claim 2 wherein the one or more support rods includes a roller or pin disposed within the top track and a roller or pin disposed within the bottom track.

4. The shade system of claim 3, wherein the one or more support rods are telescoping to increase or decrease in length as the distance between the first track and the second track varies.

5. The shade system of claim 1, wherein the shade comprises two or more adjacent shade panels configured slide with respect to each other.

6. The shade system of claim 5, wherein the two or more adjacent panels include two or more panels having different size or shape.

7. The shade system of claim 5 further comprising a guide wire interconnecting the adjacent shade panels.

* * * * *